United States Patent [19]

Jubinski

[11] 4,090,466
[45] May 23, 1978

[54] GAS ECONOMIZER

[76] Inventor: Stephen Jubinski, 98-1162 Iliee St., Honolulu, Hi. 96701

[21] Appl. No.: 788,587

[22] Filed: Apr. 18, 1977

[51] Int. Cl.² .................... F02B 77/08; G01L 19/12
[52] U.S. Cl. .......................... 116/114 AE; 73/115; 123/198 R; 180/108
[58] Field of Search .... 116/114 AE, 114 C, 114 AD, 116/114 PV, DIG. 8; 180/108; 123/198 R

[56] References Cited

U.S. PATENT DOCUMENTS

| | | | |
|---|---|---|---|
| 3,200,787 | 8/1965 | Darnell | 116/114 PV |
| 3,224,264 | 12/1965 | Becciani et al. | 116/114 PV X |
| 3,241,514 | 3/1966 | Grimland | 116/114 PV |
| 3,263,503 | 8/1966 | White | 73/115 X |
| 3,742,898 | 7/1973 | Souza | 116/114 PV |

Primary Examiner—Daniel M. Yasich
Attorney, Agent, or Firm—George W. T. Loo

[57] ABSTRACT

Gas "Eggconomizer" is a visual display device which indicates the rate of fuel consumption in an internal combustion engine. The device is loaded on the dash of an automobile and is connected by a tube to the intake manifold of the engine. The device includes an egg-shaped transparent container, an egg-shaped core with an elastic coating within the container, a support at the bottom of the container and a tube connected near the top of the container. When the device is subjected to the intake manifold vacuum, the upper half of the elastic coating reacts by varying in size to reflect the magnitude of the vacuum. High vacuum, which indicates minimal gas consumption, increases the size; while low vacuum, which indicates increased gas consumption, decreases the size. The device can be used to improve gas conservation driving habits.

5 Claims, 5 Drawing Figures

GAS ECONOMIZER

BACKGROUND OF THE INVENTION

1. Field of Invention

The invention relates to a visual display device which indicates the rate of fuel consumption in an internal combustion engine by use of the engine's intake manifold vacuum.

2. Description of the Prior Art

Prior art rate of fuel consumption indicators, such as White (U.S. Pat. No. 3,263,503, dated Aug. 2, 1966); Dixson (U.S. Pat. No. 3,922,909, dated Dec. 2, 1975); Health (U.S. Pat. No. 3,937,202, dated Feb. 10, 1976); Bunker (U.S. Pat. No. 3,942,364, dated Mar. 9, 1976); and Byington, Jr., (U.S. Pat. No. 3,977,238, dated Aug. 31, 1976) are too expensive to manufacture and too complicated for the average driver to use. My invention is inexpensive to manufacture and easy for the average driver to use. Moreover, my invention is designed to encourage minimal foot pressure on the gas pedal for a greater gas economy.

SUMMARY OF THE INVENTION

The invention relates to a rate of fuel consumption indicator for internal combustion engines. It provides a visual display of the engine's intake manifold vacuum. It works on the principle that the greater the intake manifold vacuum, the lower the gas consumption and vice versa. It is designed to encourage minimal foot pressure on the gas pedal for greater gas economy.

An object of this invention is a fuel economy display device for internal combustion engines.

Another object of this invention is to provide a fuel economy display device which is inexpensive and easy to use.

Still another object of this invention is to provide a fuel economy display device which can be used to promote economical driving habits.

A still another object of this invention is to provide a fuel economy display device which is effective, simple to use, inexpensive, easy to manufacture, easy to install and easy to maintain.

A further object of this invention is to provide a visual display device to provide the driver of an automobile with a continuous and instantaneous indication of the engine's intake manifold vacuum so that the driver can improve his gas conservation driving habits.

Another object of this invention is to provide a visual display device which will encourage minimal foot pressure on the gas pedal of an automobile for greater gas economy.

Still another object of this invention is to provide a visual display of an internal combustion engine's intake manifold vacuum to the driver of the automobile so that he will be aware of the effect of his driving habits on fuel economy.

Other objects, features and advantages of the present invention will be readily apparent from the following detailed description taken in connection with the accompanying drawing.

DESCRIPTION OF THE PREFERRED EMBODIMENT

Figure 1:
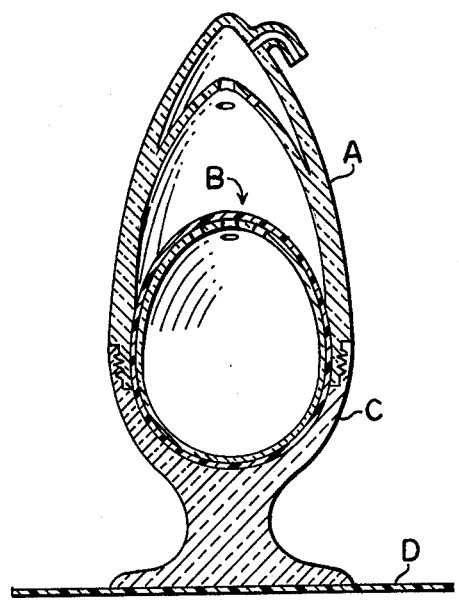
FIG. 1 is a sectional view of a preferred embodiment of the invention.
Figure 2:
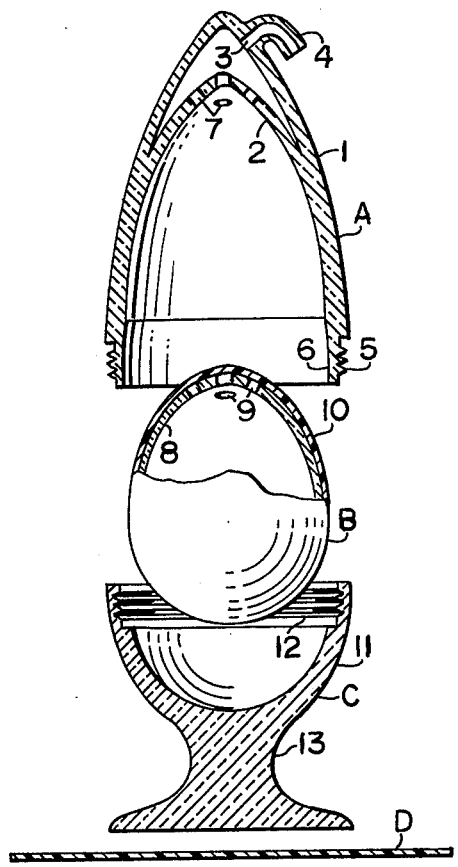
FIG. 2 is an exploded view of FIG. 1.

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Referring now to the drawing wherein like reference letters and numerals refer to like and corresponding parts throughout the several views, the preferred embodiment of the invention disclosed in FIGS. 1 to 5 inclusive, includes an upper shell portion A, a core B, a lower shell portion C, and a support D. The upper shell portion A includes side 1, retainer 2, opening 3, tube 4, threaded portion 5, curved portion 6 and openings 7. Core B includes casing 8, openings 9 and coating 10. Lower shell portion C includes side 11, threaded portion 12 and base 13.

Upper shell portion A is threaded onto lower shell portion C to form an airtight egg-shaped container except for opening 3. Core B fits within the container. Core B is seated within the lower shell portion C and is kept in place by the curved portion 6 of upper shell portion A. Support D is connected to the bottom of base 13.

Retainer 2 has openings 7. Openings are five in number, although one opening would be sufficient. (See FIG. 4). The actual number of openings is a matter of preference so long as the sensing of the intake manifold vacuum is not interfered with. Retainer 2 limits the expansion of coating 10. (See FIG. 3).

Tube 4 is connected on one end to side 1 in register with opening 3 (see FIG. 2) and is operatively coupled at the other end to the intake manifold of an internal combustion engine (not shown). Opening 3 serves as a vacuum intake opening for the vacuum of the intake manifold.

Figure 3:
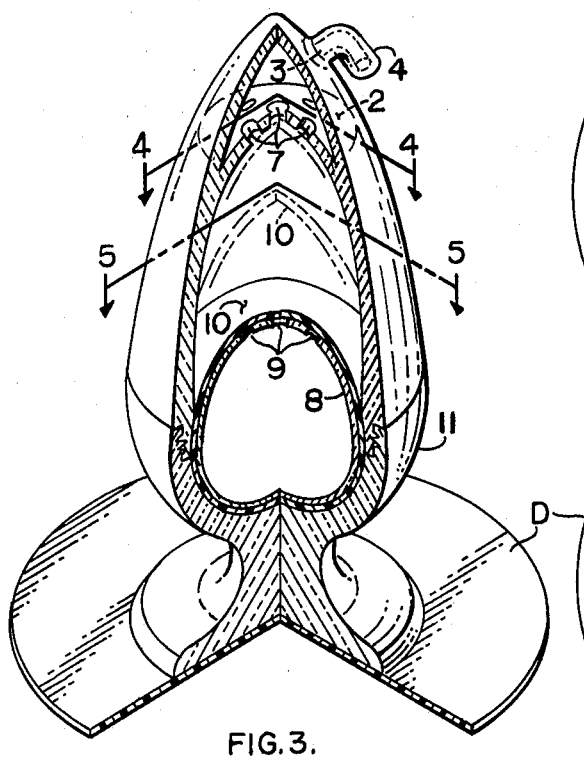
FIG. 3 is a sectional view of the preferred embodiment of the invention showing the various stages of expansion of the coating.
Figure 4:
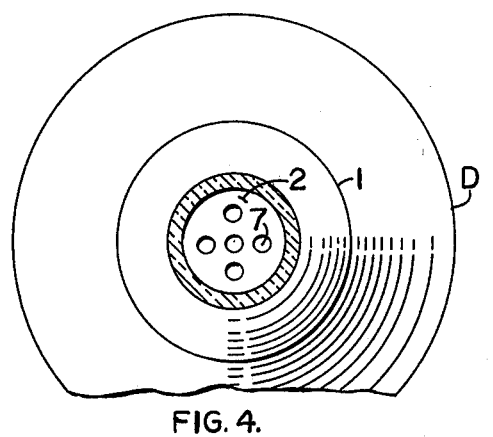
FIG. 4 is a sectional view taken on line 4—4 of FIG. 3.
Figure 5:
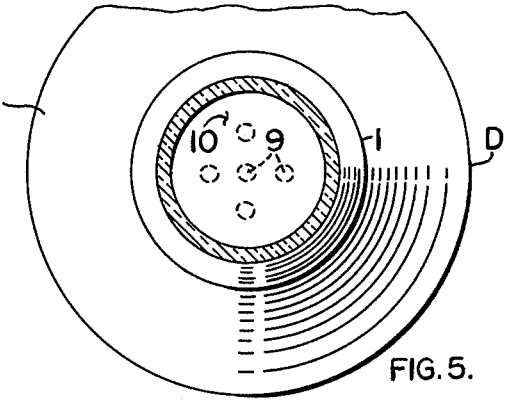
FIG. 5 is a sectional view taken on line 5—5 of FIG. 3.

Core B is egg-shaped and hollow. Casing 8 has openings 9 in its top portion. Openings 9 are five in number, although one opening would be sufficient. (See FIG. 5). The actual number of openings is a matter of preference so long as coating 10 is allowed to react readily to the intake manifold vacuum. When the upper half of the egg-shaped coating 10 is subjected to the intake manifold vacuum of an internal combustion engine, it increases or decreases in size depending on the magnitude of the vacuum. High vacuum, which indicates minimal gas consumption, increases the size of coating 10. Low vacuum, which indicates increased gas consumption, decreases the size of coating 10. FIG. 3 shows the various stages of expansion of coating 10.

Support D provides greater stability when my invention is placed on the dashboard of an automobile. It may be dispensed with if it is deemed that base 13 provides enough stability. In the preferred embodiment, support D is glued onto the bottom of base 13. It may be secured to base 13 in any other acceptable manner.

In the preferred embodiment, upper shell portion A and lower shell portion C are made of transparent plastic; casing 8 of core B is made out of transparent plastic; coating 10 of core B is made out of an elastic material, such as plastic or rubber; and support D is made out of an elastic material, such as plastic or rubber. Casing 8 is rigid. There is no opening in coating 10. Coating 10 is colored white. However, coating 10 may be colored with any other color, preferably colors of eggs. My invention may be made of any suitable material provided it gives the appearance of a egg and core B may be seen when it is encased within upper shell portion A and lower shell portion B.

My invention involves the sensing of the intake manifold vacuum of an internal combustion engine. Because intake manifold vacuum is essentially related to the volume of air-fuel mixture being consumed by an engine, it is indicative of the rate of fuel consumption and hence to the operating economy of the automobile powered by the engine. High vacuum indicates low gas consumption. Low vacuum indicates high gas consumption. The sensing of the intake manifold vacuum is performed by expansion and contraction of coating 10. Coating 10 expands with high vacuum and contracts with low vacuum. It provides a continuous and instantaneous indication of intake manifold vacuum.

My invention was designed to promote economical driving habits, such as accelerating slowly, getting into high gear as soon as possible and avoiding erratic movement of the gas pedal. It promotes the concept of driving as if there is an uncooked egg between the driver's foot and the gas pedal. It is the embodiment of the, "Watch the Egg While You Drive with Your Foot on It", concept.

My invention makes it easy to get good gasoline mileage as it makes it easy for a driver to drive as if there is an uncooked egg between his foot and the gas pedal. A driver can tell if he is putting too much pressure on the gas pedal as the size of coating 10 (Egg) will vary inversely with his pressure on the gas pedal. The object is to make the egg as large as possible for good gas mileage. By monitoring my invention, a driver is encouraged to use minimal foot pressure. Minimal foot pressure results in good gas mileage. A gentle touch on the accelerator saves more gasoline than any other single method of economy driving.

My invention is a visual display device which indicates the rate of fuel consumption in an internal combustion engine. The device is located on the dashboard of an automobile and is connected by a tube to the intake manifold of the engine. It is easy to manufacture, inexpensive, easy to install, simple to use and easy to maintain. It will make drivers aware of their poor driving habits which result in poor gasoline mileage. By watching my invention, a driver can drive as if his foot is on a raw egg as the effects of foot pressure on the gas pedal are as though the egg is in fact under the foot because its size varies inversely with the foot pressure. My invention provides visual display of engine efficiency which can be used to improve gas conservation driving habits.

My invention is a gas saver or gas economizer. The word "egg" was substituted for the letter "*e*", first occurrence, in the word "economizer" because my invention is an egg-shaped gas economizer.

Although but a single embodiment of the invention has been disclosed and described herein, it is obvious that many changes may be made in the size, shape, arrangements and details of the various elements of the invention without departing from the scope of the novel concepts of the present invention.

I claim as my invention:

1. A gas economizer indicator comprising an upper shell, an egg-shaped core, and a lower shell; the core includes a hollow casing with an opening in its top portion and an elastic coating thereabout which is adapted to be responsive to a selected degree of intake manifold vacuum of an internal combustion engine, the core is seated within the lower shell and is kept in place by the curved portion of the upper shell; the upper shell is threaded onto the lower shell to form an airtight transparent container except for an opening near the top of the upper shell, the shell top opening serves as a vacuum intake opening.

2. The gas economizer of claim 1, wherein the upper shell has a retainer near its top portion and the retainer has an opening.

3. The gas economizer of claim 1, wherein a support is connected to the bottom of the base of the lower shell.

4. The gas economizer of claim 2, wherein one end of a tube is connected to the upper shell in register with the opening in the upper shell and the other end of the tube is adapted to be operatively coupled to an intake manifold of an internal combustion engine.

5. The gas economizer of claim 2, wherein the container is substantially egg-shaped and a support is connected to the bottom of the base of the lower shell.

* * * * *